June 26, 1928.  1,674,891
M. DUCHANGE
APPARATUS FOR THE TRANSFORMATION OF ETHYLSULPHURIC
ACID INTO ALCOHOL OR ETHERS
Filed Jan. 19, 1925
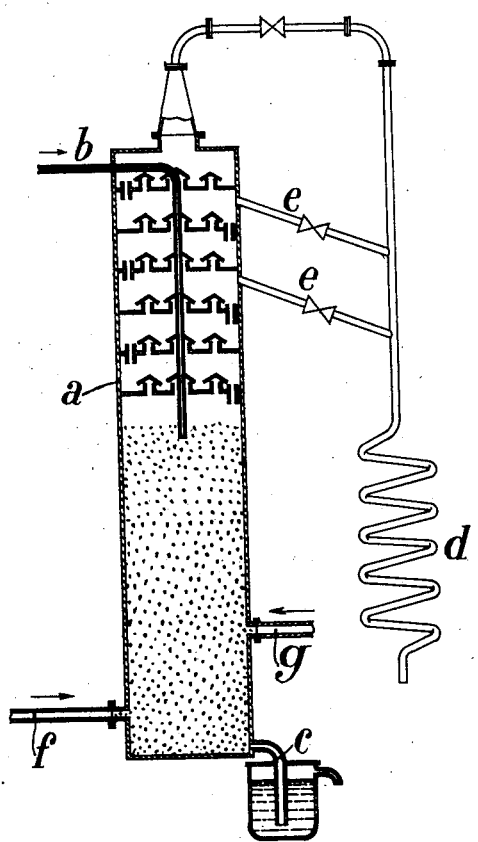
Inventor
Maurice Duchange
By Marks & Clerk
Attys.

Patented June 26, 1928.

1,674,891

UNITED STATES PATENT OFFICE.

MAURICE DUCHANGE, OF BULLY-LES-MINES, FRANCE, ASSIGNOR TO COMPAGNIE DE BÉTHUNE, OF BULLY-LES-MINES, FRANCE.

APPARATUS FOR THE TRANSFORMATION OF ETHYLSULPHURIC ACID INTO ALCOHOL OR ETHERS.

Application filed January 19, 1925, Serial No. 3,526, and in France February 11, 1924.

The means used up to this day for transforming ethylsulphuric acid into alcohol or ether consist, in general, in putting water in ethylsulphuric acid and in substantially distilling the mixture in a distillation apparatus surmounted by any columns for removing phlegms. This process, obviously simple, offers however some inconveniences. Being discontinuous, it requires numerous or cumbersome treatment apparatus relative to the quantity of alcohol recovered since sulphovinic acid contains at the maximum only 22% of ethylene; moreover, the heat produced by diluting the acid with water is not used or is badly used for the subsequent distillation of the alcohol supplied. On the other hand, in order to obtain a saponification as complete as possible of ethylsulphuric acid, a great excess of water is necessary and a somewhat diluted sulphuric acid is obtained as residue, this constituting an important inconvenience for certain uses for which the residual acid is reserved or for its regeneration in a concentrated condition. Finally, in these conditions, the saponification of sulphovinic acid is a rather long operation and the heating of the distillation apparatus is not easy as, unless residual acid too diluted is obtained, the liquid must be raised to temperatures which may reach 160° to 170° C. The use of vacuum for diminishing these distillation temperatures, is always accompanied by a substantial diminution of output.

The present invention consists in treating by water vapor, ethylsulphuric acid circulating on the counter-current principle and in a continuous manner in any column, the water vapor playing at the same time the part of saponification agent and of calorific agent for the production of alcohol (or ether) and its distillation.

The present invention is also characterized by the device adopted for the saponification of sulphovinic acid by water vapor.

This device is composed, as indicated by the single figure of the accompanying drawing, of a column $a$ suitably protected against heat losses and the lower half of which is filled for instance with any dividing materials and the upper half is constructed as an apparatus provided with plates for removing phlegms. The column might also be entirely filled with dividing materials or solely constituted by a plate column. The sulphovinic acid is fed by a conduit pipe $b$ which passes through the upper plate column, where it is reheated and enters in the lower portion, the acid then pouring on the dividing materials, passes through them and issues through the pot $c$. The water vapor enters at the bottom (pipe line $f$) and circulates in reverse direction, it is partly condensed in the sulphovinic acid and the heating resulting therefrom produces the boiling of the liquid mixture and the evaporation of the alcohol or ether which has been formed; the latter are drawn away by the water vapor and the mixture is freed from phlegms in the plate column where it loses the greater portion of its water; the condensed water returns to the lower portion of the apparatus for participating to the saponification of ethylsulphuric acid, thus saving a portion of the water vapor. The vapors issuing from the column are condensed in a cooler $d$ and side conduit pipes $e$ permit to collect, according to the level, a liquid of determined concentration in alcohol and ether.

The calories necessary:

1.—For the saponification of the sulphovinic acid according to the equations:

$$H_2O + SO_4HC_2H_5 \rightleftharpoons SO_4H_2 + C_2H_5OH$$
$$H_2O + 2SO_4HC_2H_5 \rightleftharpoons 2SO_4H_2 + C_2H_5OC_2H_5$$

and:

2.—For the evaporation of ether and alcohol, are supplied on the one hand by the hydratation of the sulphuric acid formed and, on the other hand, by the heat of condensation of the water vapor which condenses at 100° C.

On the other hand, if the residual sulphuric acid is reserved for the production of sulphate of ammonia, it is possible as stated in the British patent application No. 10,469, filed on the 17th April, 1923, to send through the bottom of the column (piping $g$) a stream of gaseous ammonia which, by neutralizing a portion of the acid formed, will have the double advantage, of giving off its heat of neutralization and of increasing the rate of saponification of the sulphovinic acid whilst extending the limit of this saponification.

This invention presents, over the means used up to now for the saponification of ethylsulphuric acid, numerous advantages:

1.—Use of a simple apparatus operating in a continuous manner.
2.—Complete utilization of the heat of solution of water in the acid.
3.—Production of alcohol or ether at will.
4.—Rapid operation.
5.—The heating necessitates only water vapor at 100° C.

What I claim as my invention and desire to secure by Letters Patent is:

An apparatus for the hydrolysis of alkyl-sulphuric acids which comprises a column, contact plates in the upper portion of said column, distributing filling material in the lower part of the column, a vapor outlet in the top of said column, means for removing condensate from certain of said plates, means for introducing the alkyl-sulphuric acid to be hydrolyzed to said distributing filling material comprising means for passing said alkyl-sulphuric acid in heat exchange relationship with vapors rising through said plates, means for introducing steam into the lower end of said column, means for introducing a neutralizing agent into the bottom of said column, means for removing residue from the bottom of said column, and means for condensing vapors issuing from the top of said column.

In testimony whereof I have signed my name to this specification.

MAURICE DUCHANGE.